Aug. 8, 1933.  H. NELSON  1,921,633

FRUIT HALVING AND QUARTERING MACHINE

Original Filed Dec. 6, 1929

INVENTOR.
Herman Nelson.
BY
Townsend, Loftus & Abbett
ATTORNEYS.

Patented Aug. 8, 1933

1,921,633

UNITED STATES PATENT OFFICE 1,921,633

FRUIT HALVING AND QUARTERING MACHINE

Herman Nelson, San Francisco, Calif.

Application December 6, 1929, Serial No. 412,194
Renewed March 7, 1933

8 Claims. (Cl. 146—72)

My invention relates to a machine for cutting fruits and more particularly to a machine which is adapted to halving and quartering a certain type of preserved cherries known to the trade as maraschino cherries.

The process of preserving the maraschino cherry includes a chemical treatment, which, after the seed or stone has been removed, bleaches the flesh of the fruit and renders it relatively firm in texture. The fruit is then subjected to a dyeing process whereby it is given a pleasing color and then flavored with maraschino or preserved in maraschino cordial in a suitable container for marketing.

The maraschino cherry is used in the confectionary trade either in whole, half, or quarter portions. It is therefore my object to provide an improved machine for cutting fruits and also to provide a machine whereby maraschino cherries may be cut into half or quarter portions, either before, after, or between any of the successive steps of their preserving process.

I attain my object through the provision of a machine which through novel features of its construction is adapted to receive and hold cherries while they are passed over a halving knife, to automatically pass a quartering knife through them after they have been halved and to expel them when they have been quartered.

Other objects of my invention are set forth in the accompanying drawing and specification which form a part of this application.

In drawing—

Figure 1:
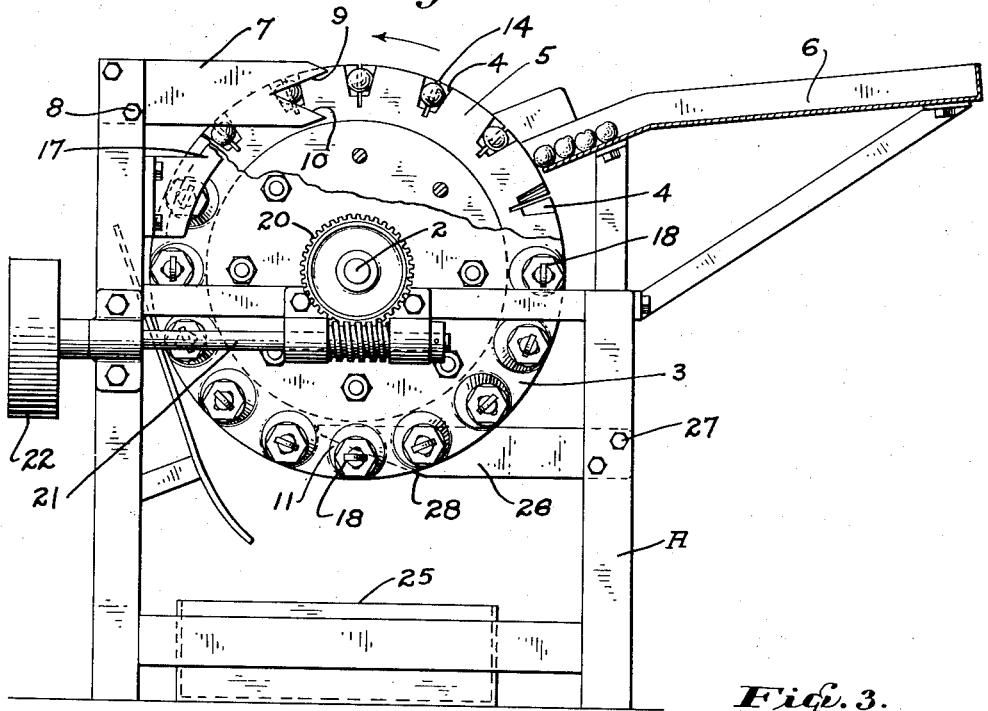
Figure 3:
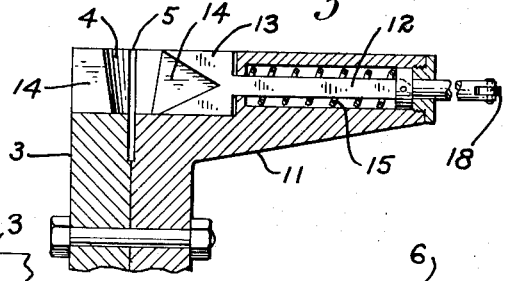
Figure 2:
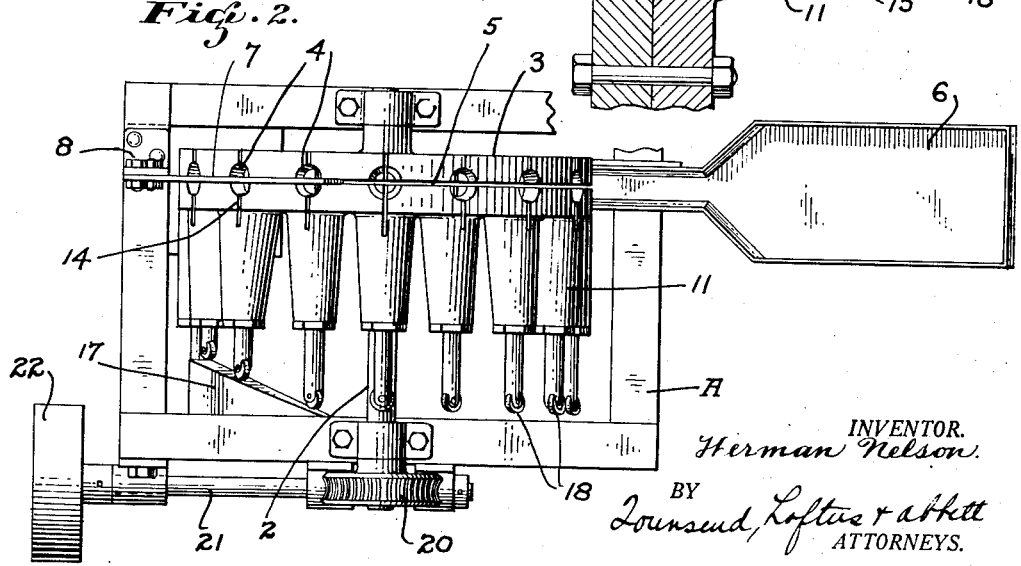

Fig. 1 is a side elevation of the machine which I have chosen to illustrate the principles of my invention, with a part broken away to disclose the operation of concealed parts, Fig. 2 is a plan view of the machine shown in Fig. 1, and Fig. 3 is an enlarged section showing the construction of the quartering knives in the machine.

Referring to the drawings in detail and especially Figs. 1 and 2, A indicates a frame in which is journalled a shaft 2. Secured on the shaft is a rotor 3 and formed in the outer peripheral surface thereof are a plurality of interspaced pockets 4, and an annular groove 5 which cuts through or intersects the pockets for purposes hereinafter described.

Disposed at one side of the rotor and supported by the frame is a chute 6 to which fruit such as cherries is delivered in any suitable manner. This chute is inclined, as shown, and the cherries will accordingly discharge by gravity and enter the pockets one by one during the rotation of the rotor. The cherries thus fed are delivered to the pockets of the rotor and may, in this instance, be cut into halves or quarters as desired. Where halving alone is desired a knife such as shown at 7 is employed. This knife is stationary and is secured to the frame as at 8. The front or cutting end of the knife projects into the annular slot 5 and is provided with an inverted V-shaped notch which is sharpened to form opposed cutting faces, such as shown at 9 and 10. During rotation of the rotor each cherry is engaged by the opposed cutting edges of the knife and is thereby cut with a shearing action. This is important as engagement of the cherries by the opposed cutting edges does away with all tendency to force the cherries down into the pockets where they might lodge or become jammed so as to prevent their discharge by gravity.

By referring to Figs. 2 and 3, it will be noted that the rotor is provided with a plurality of laterally extending bearings or bosses, such as indicated 11, there being one bearing for each pocket and the bearings aligning therewith. A plunger stem 12 is disposed in each bearing and the inner end of each stem carries a cutting knife 13, similar in shape to the knives shown at 7. The knives are guided in cross slots 14 which intersect the pockets and the annular slot 5, and if reciprocal movement is imparted to the knives quartering of the cherries will take place. The knives are normally held in retracted position by springs 15 and when quartering of the cherries is desired a cam such as shown at 17 is employed. This is secured to the frame as shown in Fig. 2. Each stem is provided with a roller 18 at its outer end and as the rollers engage the surface of the cam 17 each knife is forced inwardly, thus passing through the adjacent pocket and severing or quartering the cherry disposed therein.

In actual operation shaft 2 to which the rotor is secured may be driven in any suitable manner, or as here illustrated through means of a worm gear drive 20, which in turn is driven through a drive shaft 21 and pulley 22. With power applied rotor 3 revolves and as each pocket 4 passes by the chute 6 a cherry is delivered thereto. The cherries will first be halved by the knife 7 and if quartering is desired cam 17 is applied so that a reciprocal or inward movement is imparted to each knife 13. Ordinarily the cherries whether halved or quartered will drop out of the pockets by gravity when they assume their lowermost position and they may discharge into a pan or container such as shown at 25.

Where fruits are handled that contain more or less syrup or sticky substance an ejector plate such as shown at 26 may be employed. This plate is secured to the frame as shown at 27 and the front end thereof projects into the annular slot 5. The lower face of the plate is inclined as shown at 28 and if the fruit has not already discharged by gravity it will be engaged by the inclined surface of the plate and thereby forcibly ejected.

From the foregoing it will be noted that the fruit may be either halved or quartered as desired as cam 17 is removably attached to the frame as shown in Fig. 1. It will further be noted that jamming of the fruit in the pockets is avoided by the V-shaped formation of the cutting knives and also that a clean cut is obtained due to the shearing action of the inclined cutting edges. The capacity or output of a machine of this character is considerable as it may be rotated at a fairly high speed and as its operation is substantially automatic, the only labor required is that of supplying chute 6 with cherries. This may also be eliminated as an endless conveyor can deliver the fruit thereto.

While certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. A device of the character described comprising a frame, a rotor journalled therein said rotor having a plurality of pockets formed in its outer peripheral surface, said rotor also having a plurality of transverse slots formed therein dividing the pockets into halves, a plurality of knives carried by the rotor, one knife for each pocket and aligned and guided by the transverse slots, means normally maintaining the knives retracted with relation to the pockets, and other means for transmitting a reciprocal movement thereto so as to cut the fruit into halves.

2. A device of the character described comprising a frame, a rotor journalled therein said rotor having a plurality of pockets formed in its outer peripheral surface, said rotor also having a plurality of transverse slots formed therein dividing the pockets into halves, a plurality of knives carried by the rotor, one knife for each pocket and aligned and guided by the transverse slots, means normally maintaining the knives retracted with relation to the pockets, and a cam member whereby reciprocal movement is transmitted to the knives to cut the fruit.

3. A device of the character described comprising a frame, a rotor journalled therein said rotor having a plurality of pockets formed in its outer peripheral surface, said rotor also having an annular groove formed in its outer surface and cutting through and intersecting the pockets, means for delivering fruit to be halved one to each pocket, a stationary knife having one end projecting into the annular groove so as to intercept and cut the fruit into halves during rotation of the rotor, said knife having an inverted V-shaped cutting surface, said rotor having cross slots formed therein intersecting the pockets at right angles to the annular groove, and a cutting member extending into each slot and so positioned as to intercept and cut the fruit into quarters.

4. A device for severing fruit comprising a rotor having pockets for the reception of fruit, knives mounted for reciprocation in a direction parallel to the axis of rotation of said rotor and through said pockets to sever fruit carried thereby, and means for reciprocating said knives.

5. A device for severing fruit comprising a rotor having pockets for the reception of fruit, and knives carried by the rotor and mounted for reciprocation in a direction parallel to the axis of rotation thereof and through said pockets, the cutting edges of said knives being disposed radially of the rotor.

6. A device for severing fruit comprising a rotor having pockets for the reception of fruit, knives mounted for reciprocation in a direction parallel to the axis of rotation of said rotor and through said pockets to sever fruit carried thereby and means automatically operable upon rotation of the rotor to reciprocate said knives.

7. A device for severing fruit comprising a rotor having pockets for the reception of fruit, knives mounted for reciprocation in a direction parallel to the axis of rotation of said rotor and through said pockets to sever fruit carried thereby and cam means co-operating with said knives to impart reciprocal motion to them upon rotation of said rotor.

8. A device of the character described comprising a frame, a rotor journaled therein, said rotor having a plurality of pockets formed in its outer peripheral surface, said rotor also having a plurality of transverse slots intersecting said pockets; a plurality of knives carried by the rotor, one knife for each slot and aligned and guided by said slots, means normally maintaining the knives retracted with relation to the pockets and other means for transmitting a reciprocal movement thereto so as to sever fruit carried by the pockets.

HERMAN NELSON.